April 14, 1953      L. LINET      2,634,501
DENTAL DRILL AND GAUGE DEVICE
Filed Dec. 2, 1950
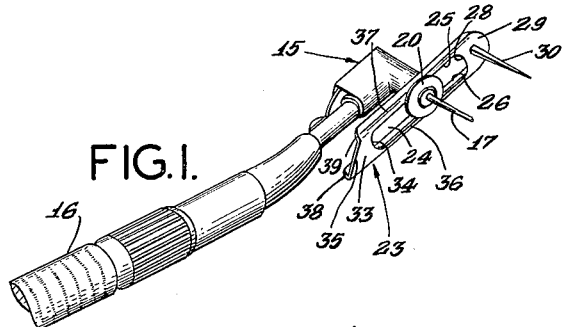
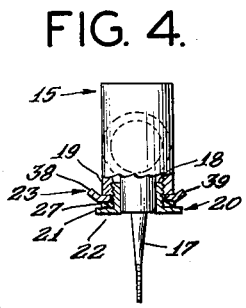
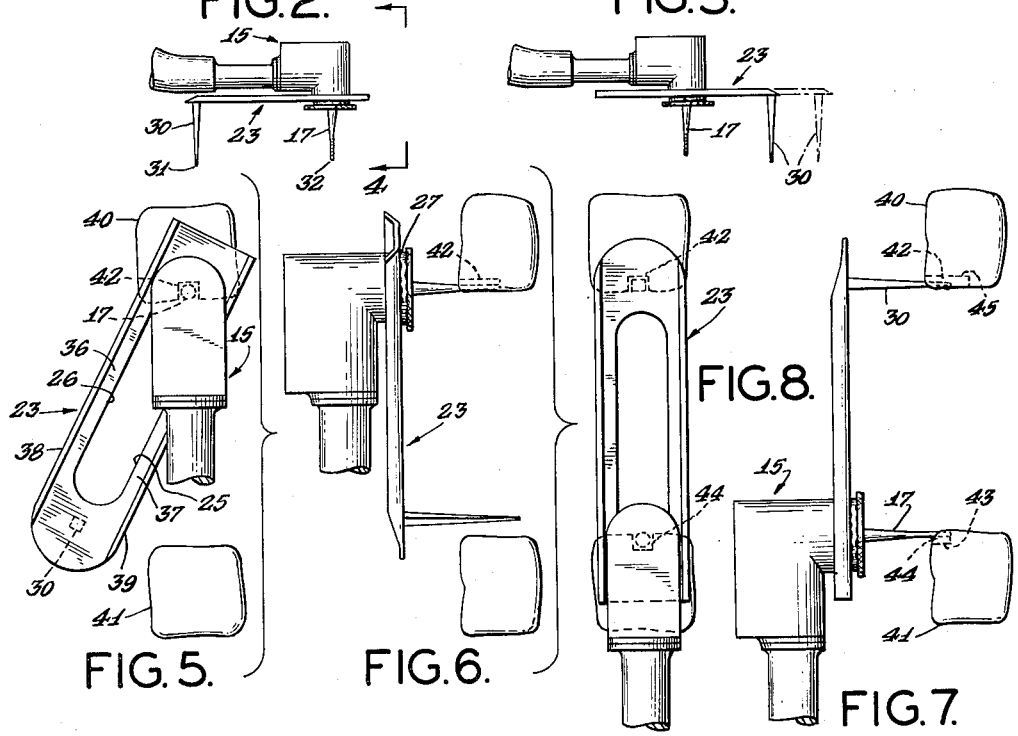
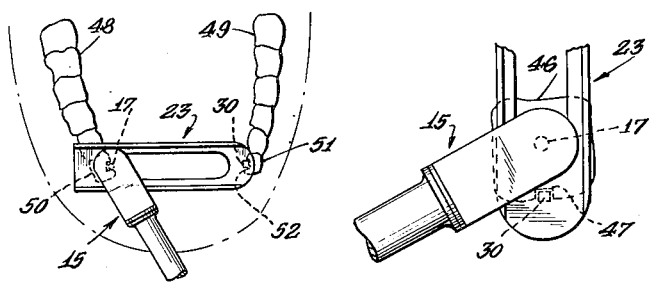
INVENTOR.
LEO LINET
BY
ATTORNEY.

Patented Apr. 14, 1953

2,634,501

UNITED STATES PATENT OFFICE 2,634,501

DENTAL DRILL AND GAUGE DEVICE

Leo Linet, Patchogue, N. Y.

Application December 2, 1950, Serial No. 198,833

2 Claims. (Cl. 32—67)

This invention relates to dental drill and gauge devices—more particularly to the combination of a contra-angle drill device and gauge attachment for producing parallel grooves, cuts or holes within teeth in connection with the preparation of various dentures.

Wherever parallelism is needed in spaced dental drill operations, the utmost caution and skill are required of the dentist, since failure to obtain true parallelism may result in damaging strains upon the teeth, or the utter failure of the denture. Where, for example, grooves are to be prepared in two adjacent teeth requiring parallel walls, it is necessary, when employing the customary conventional methods, that after the preparation of the first groove, the second one be prepared by many intermittent operations, the drill being repeatedly moved from the first groove to the second one being prepared to enable the dentist to determine visually the accuracy of the work, and to gauge by eye the parallelism obtained during the progress of drilling. Since it is required to drill the second tooth, return the drill to the first tooth for gauging purposes so as to determine whether the required surfaces are in the same or parallel planes—a series of steps that are repeated until the job is finished—not only is there loss of time, but the possibility of error is correspondingly great. In an attempt to overcome this shortcoming, various gauges have been devised, the purpose of these being either to enable parallel markings to be made on the second tooth (requiring repeated checks after each drilling operation), or to use these gauges directly in the mouth for measuring purposes. Not only do these gauges thus fail to remove one of the main disadvantages, that of interrupting the drilling operation, but they are utterly unsatisfactory where the space between adjacent teeth being prepared is too small to permit the insertion of a marking implement or the gauge element.

It is primarily within the contemplation of my invention to provide a device which will be effective in obtaining the required parallelism without any of the disadvantages and shortcomings aforesaid which characterize conventional methods. And in this aspect of my invention it is an important object to enable drilling and gauging operations to be effectuated intra-orally, without the need repeatedly to move the drill between the first completed preparation and the second one being prepared, and without the need to remove the drill from the mouth to take parallel gauge measurements.

It is also an object of my invention to provide an attachment for use with a conventional contra-angle drill structure, whereby a unitary device is formed which will permit both drilling operations in conventional manner and parallel measurements by means of the gauge attachment. And in this aspect of my invention it is within my contemplation to enable the attachment to be adjusted for different distances between the gauge and drill components in accordance with the space between the parallel grooves or cuts being prepared. And it is also an object of my invention to enable the gauge component to be pivotally adjusted, to accomodate the convenience of the dentist particularly in forming parallel walls on teeth on opposite sides of the mouth, or not in a direct line.

It is a further object of my invention to provide a device in the above-mentioned category in which the gauge attachment may readily be secured or removed from the contra-angle, for the purposes of replacement with other similar attachments, or to enable the drill to be used as a separate and independent unit.

And it is within my contemplation to enable the device to be operatively employed without obstructing the line of vision to the teeth being prepared.

It is within my contemplation to provide a relatively simple and inexpensive device that is capable of performing the functions above-mentioned, particularly of producing grooves, cuts or holes such as may be required for the making of open-face crowns, inlay bridges or other dentures where parallelism is required.

Other objects, features and advantages will appear from the drawings and the description hereinafter given.

Referring to the drawings,

Figure 1 is a perspective view of a dental drill and gauge device in accordance with the preferred form of my invention, shown as applied to a contra-angle structure.

Figure 2 is a side view of the device of Figure 1, showing a fragment of the cable-casing, the gauge member being shown in a retracted position.

Figure 3 is a view substantially like Figure 2, but showing the gauge member in a partially projected position, substantially as in Figure 1, the dot-dash lines showing the member in a fully projected position.

Figure 4 is an end view of Figure 2 looking from line 4—4, a fragment being broken away for clarity.

Figure 5 is a plan view of two spaced teeth, showing the device with its drill within a groove formed thereby, the gauge member being in a retracted angular position.

Figure 6 is a side view of Figure 5.

Figure 7 is a side view of the teeth and the device of Figures 5 and 6, but showing the gauge member in projected position, with the guide pin of the gauge member within the previously formed groove, and with the drill performing a drilling operation within the other tooth.

Figure 8 is a top view of Figure 7.

Figure 9 is a fragmentary top view of the device of my invention in the process of drilling a hole in a tooth, the guide pin of the gauge element being shown operatively disposed within a previously prepared groove in the same tooth, and Figure 10 is a plan view of a mouth with two oppositely disposed rows of teeth, the device of my invention being shown operatively applied for preparing the groove in a tooth on one side of the mouth, with the guide pin of the gauge member positioned adjacent a previously formed groove in a tooth on the opposite side of the mouth.

In the form of my invention illustrated, a contra-angle drill member 15, connected to cable-driving means of conventional nature within casing 16, has operatively connected thereto the drill 17 attached to the drill holder 18 disposed within the casing 19. A rotatable flanged bushing 20 extends within and is in threaded engagement with casing 19, the peripheral edge 21 of flange 22 being knurled to facilitate rotation of said bushing 20. The gauge member 23 contains the slotted portion 24, the said bushing extending through said slotted portion 24, the flange 22 thereof extending over the slotted portion as clearly illustrated. The lateral walls 25 and 26 of slotted portion 24 are slidably engageable with the portion of the bushing extending through the slot, whereby the gauge member 23 may be adjustably manipulated, as will more clearly hereinafter appear. Disposed between the gauge member 23 and the flange 22 of bushing 20 is the washer 27 which preferably has opposite serrated surfaces for frictional engagement with said flange and member.

Adjacent the terminal 28 of slot 24 is the guide pin wall 29 to which is fixedly attached the guide pin 30 normal to wall 29, whereby the pin 30 will be parallel to drill 17. It is preferred that said pin 30 extend beyond the drill 17—that is, that the terminal 31 of the gauge extend outwardly beyond the terminal 32 of the drill. It is also preferred that the wall 33 adjacent slot terminal 34 be relatively narrow, so that the edge 35 be as close as possible to the slot terminal 34 without weakening the structure. Both walls 29 and 33 as well as the marginal walls 36 and 37 are all preferably in one plane, so as to assure a firm operative positioning of gauge member 23, and a proper parallel relation between drill 17 and guide pin 30. Extending inwardly from the marginal portions 36 and 37 towards the contra-angle 15 are the side walls 38 and 39, whereby the member 23 is substantially channel-shaped. This arrangement, while permitting a rotary manipulation of member 23 with respect to the contra-angle 15, as will hereinafter appear, nevertheless presents no sharp surfaces that may injure the gums, since the said walls 38 and 39 are turned away from the tooth being prepared.

When the bushing 20 is operatively loosened, the gauge member 23 may be adjustably positioned relative thereto, either by sliding the member forwardly or rearwardly, or rotating the member; and after the desired position of the member is obtained, a tightening of bushing 20 will firmly maintain the member 23 in its adjusted position. For example, in Figure 1 the gauge member 23 is shown in what I will herein designate as a partially projected position, with the guide pin disposed forwardly of drill 17, the latter being disposed intermediate the slot terminals 28 and 34. In Figure 2 the gauge member has been revolved into a retracted position, with the guide pin 30 disposed rearwardly of drill 17. Figure 3 shows two projected positions of the gauge member, for different spacing between the drill 17 and the guide pin 30. And Figures 5, 9 and 10 show different angulated positions of the gauge member 23 with respect to the contra-angle 15, for different operative positions, as will hereinafter be described.

Figures 5 and 6 illustrate two teeth 40 and 41 to be prepared. The gauge member 23 is, as aforesaid, in a retracted angular position, thereby permitting the drill 17 to perform the drilling operation without obstruction by the guide pin 30. Accordingly, a slot 42 has been prepared by the drill. It is now desired to prepare another groove in tooth 41, confronting groove 42 and with walls parallel to those of said groove 42. The gauge member 23 is accordingly brought into its projected position shown in Figures 7 and 8, the position of member 23 relative to contra-angle 15 being determined by the distance between the teeth 40 and 41. The guide pin 30 is maintained in close proximity to the walls of previously formed groove 42, and the drilling operation with drill 17 begun on tooth 41. During the progress of this drilling operation, guide pin 30 is maintained in close relation to the wall of groove 42 corresponding to the desired parallel wall of tooth 41. Thus, by referring to Figure 7, it will be seen that wall 43 of the groove 44 being drilled in tooth 41 can be kept parallel to wall 45 of groove 42 in tooth 40, since the guide pin 30 is at all times maintained in close guiding position along wall 45.

It thus appears that without removing the member 23 from the contra-angle 15, a drilling operation can be performed on the first tooth. And therefore, by a simple adjusting position of the gauge member 23, the first-prepared groove may be used as a gauge for parallelism while another tooth is being drilled. And it will be observed that the entire operation of preparing the second groove is performed without the need of removing the device from the mouth, such as is required in conventional methods, as aforesaid. The continuity of operation thus remains undisturbed, thereby increasing both the speed and accuracy of the process, and reducing the inconvenience both to the dentist and patient.

Figure 9 shows the method of preparing a drilled hole in tooth 46 after using the previously prepared groove 47 as a guide. Since the contra-angle 15 is disposed at an angle with reference to the gauge member 23, there is no interference whatsoever with the positioning of guide pin 30 within or adjacent said groove 47. The drill 17 is thus maintained in a proper direction to enable a hole to be drilled parallel with the longitudinal extent of groove 47, in the manner aforesaid.

In Figure 10 are shown two rows of teeth 48 and 49 the foremost teeth 50 and 51 of said rows being intended to serve as suitable anchorages for a denture to be placed thereacross. The groove 52 had previously been prepared in tooth 51; and accordingly, the gauge member 23 is positioned so that the guide pin 30 is disposed within or adjacent said groove 52, while the drill 17 is positioned to form a parallel slot in tooth 50. The relative positions of the gauge member 23 and contra-angle 15 are clearly shown, thereby enabling the preparation to be effectively performed without any interference with the line of sight.

Should it be desired to replace gauge member 23 with one of greater or lesser length, it is obvious that a substitution can readily be effected by unscrewing bushing 20 to remove member 23, and readily substitute the new member in its place. Or should it be desired entirely to remove the gauge member so as to enable the contra-angle to be employed as a conventional drill member, all that need be done is to unscrew bushing 20 to permit the detachment of the member 23, whereafter the bushing is secured to the casing 19 in known manner.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

I claim:

1. In a dental drill and gauge device, a drill, holding means for the drill, a rigid unitary gauge member having therein a closed longitudinal slot, the said drill extending through the said slot, a guide pin immovably affixed to said gauge member and extending in a direction substantially parallel to the drill, the gauge member being slidably and rotatably mounted on said holding means whereby the guide pin may be variably spaced from the drill in different planes, and releasable securing means for holding said drill in a selected position along said slot, whereby a fixed relation is established between the drill and the pin.

2. In a dental drill and gauge device, the combination according to claim 1, said gauge member having two opposite lateral wings angularly disposed with reference to the plane of the member.

LEO LINET.

References Cited in the file of this patent

UNITED STATES PATENTS

| Number | Name | Date |
|---|---|---|
| 1,321,130 | Schlueter | Nov. 11, 1919 |
| 2,399,231 | Klein et al. | Apr. 30, 1946 |